US011763279B2

(12) United States Patent
Jones et al.

(10) Patent No.: US 11,763,279 B2
(45) Date of Patent: *Sep. 19, 2023

(54) IMMEDIATE RELEASE OF RESOURCE FOR DATA TRANSFER

(71) Applicant: The Toronto-Dominion Bank, Toronto (CA)

(72) Inventors: Christopher Mark Jones, Villanova, PA (US); Marc Chalifoux, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 127 days.

This patent is subject to a terminal disclaimer.

(21) Appl. No.: 17/381,321

(22) Filed: Jul. 21, 2021

(65) Prior Publication Data
US 2021/0350347 A1 Nov. 11, 2021

Related U.S. Application Data

(63) Continuation of application No. 16/431,796, filed on Jun. 5, 2019, now Pat. No. 11,100,480.

(51) Int. Cl.
*G06Q 20/10* (2012.01)
*G07F 19/00* (2006.01)

(52) U.S. Cl.
CPC ....... *G06Q 20/1085* (2013.01); *G07F 19/202* (2013.01); *G07F 19/203* (2013.01)

(58) Field of Classification Search
CPC .. G06Q 20/1085; G07F 19/202; G07F 19/203
See application file for complete search history.

(56) References Cited

U.S. PATENT DOCUMENTS 5,220,501 A 6/1993 Lawlor et al.
6,661,910 B2 9/2003 Jones et al.
(Continued)

FOREIGN PATENT DOCUMENTS

WO WO2017221090 12/2017

OTHER PUBLICATIONS

How to Deposit Cash at an ATM, Date of Publication: Oct. 31, 2018, https://www.thebalance.com/atm-deposits-315279.
(Continued)

*Primary Examiner* — Scott C Anderson
(74) *Attorney, Agent, or Firm* — Rowand LLP

(57) ABSTRACT

In an aspect, the present application describes a computer system. The computer system includes a communications module and a processor coupled to the communications module. The computer system include a memory coupled to the processor storing instructions that, when executed by the computer system, cause the computer system to: receive, from an automated teller machine (ATM) and via the communications module, an indication of a deposit of a value instrument; save, in the memory, a retention instruction including an associated temporal period, the retention instruction preventing withdrawal of value instruments corresponding to an amount of the deposit; receive, via the communications module, an instruction to process a data transfer to a recipient, the data transfer to the recipient accessing at least a portion of the deposit; and process the data transfer to the recipient during the temporal period using at least a portion of the deposit.

20 Claims, 7 Drawing Sheets

(56) References Cited

U.S. PATENT DOCUMENTS

| | | | |
|---|---|---|---|
| 7,653,600 B2 | 1/2010 | Gustin et al. | |
| 8,381,975 B2 | 2/2013 | Davila et al. | |
| 8,554,671 B2 | 8/2013 | Ballout | |
| 10,223,680 B2 | 5/2019 | Pigg et al. | |
| 2002/0097715 A1 | 7/2002 | Roerick | |
| 2002/0124061 A1* | 9/2002 | Mossman | G07F 19/211 |
| | | | 709/224 |
| 2003/0080185 A1 | 1/2003 | Werther | |
| 2003/0111395 A1* | 6/2003 | Aas | G07D 11/24 |
| | | | 209/534 |
| 2007/0276765 A1* | 11/2007 | Hazel | G07F 19/206 |
| | | | 705/71 |
| 2008/0301049 A1 | 4/2008 | Dyson | |
| 2010/0138343 A1* | 6/2010 | Davila | G06Q 20/1085 |
| | | | 705/43 |
| 2011/0016046 A1 | 1/2011 | Lindstrom et al. | |
| 2012/0047070 A1 | 2/2012 | Pharris | |
| 2013/0226799 A1 | 8/2013 | Raj | |
| 2015/0371326 A1* | 12/2015 | Montesano | G06Q 20/3224 |
| | | | 705/38 |
| 2016/0078430 A1* | 3/2016 | Douglas | G06Q 30/0185 |
| | | | 705/43 |
| 2018/0025331 A1 | 1/2018 | Dallenbach et al. | |
| 2019/0318424 A1* | 10/2019 | McWilliams | G06Q 20/227 |

OTHER PUBLICATIONS

Now, you can deposit cash, pay utility bills on non branded white label ATMs, Financial Express Online Date of Publication: Mar. 8, 2019, https://www.financialexpress.com/industry/banking-finance/now-you-can-deposit-cash-pay-utility-bills-on-non-branded-white-label-atms/1509211/.

CA Office Action, Canadian Patent No. 3,047,007 dated Oct. 11, 2022.

* cited by examiner

IMMEDIATE RELEASE OF RESOURCE FOR DATA TRANSFER

CROSS-REFERENCE TO RELATED APPLICATION

This application is a continuation of U.S. patent application Ser. No. 16/431,796 entitled "Immediate Release of Resource for Data Transfer", filed on Jun. 5, 2019, the contents of which are herein incorporated by reference in their entirety.

FIELD

The present application relates to systems which use automated teller machines for receiving value instruments and, more particularly, to systems for controlling resources.

BACKGROUND

Automated teller machines (ATMs) or automated banking machines (ABMs) allow certain banking activities to be performed without resort to a human teller. For example, withdrawals can be made and fulfilled by value instruments (in many cases, banknotes) dispensed by the machine. In another example, deposits can be made with value instruments inserted into the machine.

While ATMs provide convenience for users, they can introduce problems that do not exist with human tellers. For example, while a human teller may be able to quickly discern whether a deposited value instrument is valid (e.g., not counterfeit), the ATM may have more difficulty in detecting counterfeits. For example, even an ATM equipped with counterfeit detection technology may, in some instances, be defeated by new counterfeiting techniques. Counterfeit detection technology on ATMs may be difficult to update in response to new counterfeiting techniques. Due to the limitations of counterfeit detection technology on ATMs, a hold may be applied to deposits made at ATMs, including cash deposits. The hold may, for example, provide time for a human to review the cash deposits. In contrast, since human tellers are able to review non-ATM cash deposits at the time of deposit, holds may not apply to cash deposits made directly with human tellers. Such holds may create problems for some customers, making such customers less likely to use ATMs and more likely to rely on human tellers.

Additionally, ATMs may be of little use to individuals that do not have a bank (i.e., who are "unbanked") or that do not have a bank in close proximity (i.e., who are "underbanked"). A sizable number of households are either unbanked or underbanked and may, therefore, not benefit from the use of ATMs.

Thus, there is a need for improvements in systems that rely upon ATMs. However, such improvements may be complicated by the existence of existing infrastructure. It may be desirable to provide improvements in systems that rely upon ATMs without having to replace all existing ATM infrastructure.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
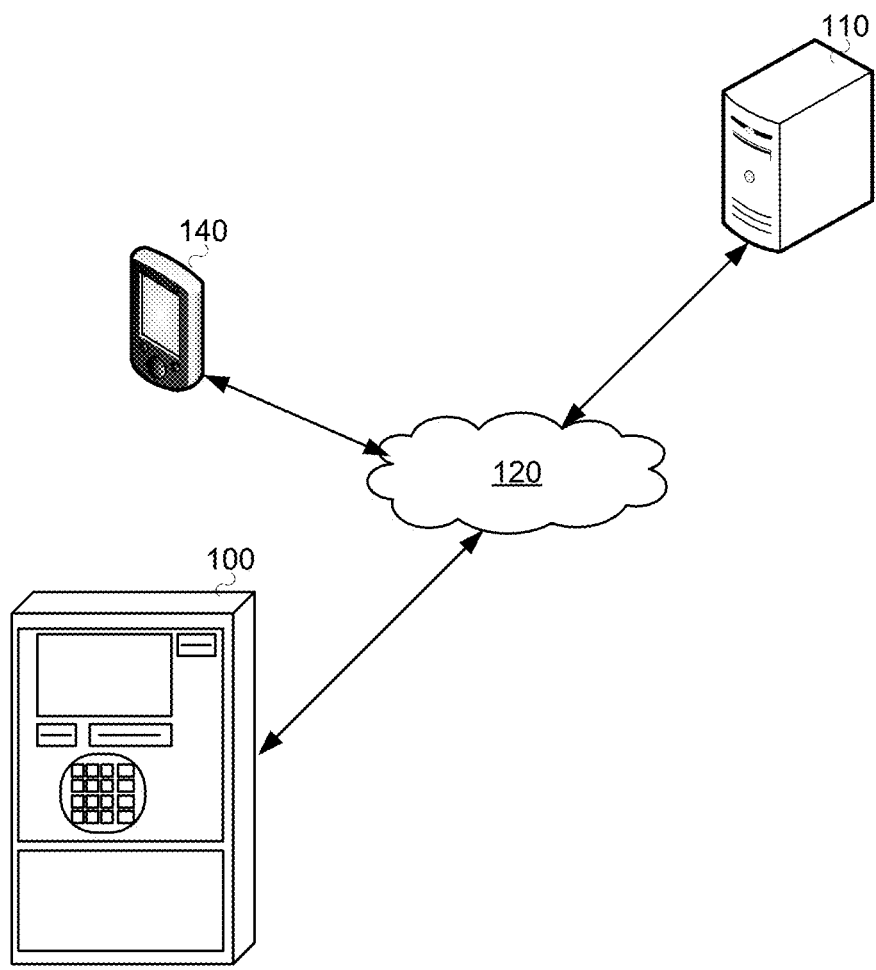
FIG. 1 is a schematic operation diagram illustrating an operating environment of an example embodiment.

According to the subject matter of the present application, there may be provided a computer system. The computer system may be a server system. The computer system may include a communications module, a processor coupled to the communications module and a memory. The memory may be coupled to the processor and may store instructions that, when executed by the computer system, cause the computer system to: receive, from an automated teller machine (ATM) and via the communications module, an indication of a deposit of a value instrument; save, in the memory, a retention instruction including an associated temporal period, the retention instruction preventing withdrawal of value instruments corresponding to an amount of the deposit; receive, via the communications module, an instruction to process a data transfer to a recipient, the data transfer to the recipient accessing at least the portion of the deposit; and process the data transfer to the recipient during the temporal period using at least a portion of the deposit.

In another aspect, there is described a computer-implemented method including: receiving, from an automated teller machine (ATM) an indication of a deposit of a value instrument; saving a retention instruction including an associated temporal period, the retention instruction preventing withdrawal of value instruments corresponding to an amount of the deposit; receiving an instruction to process a data transfer to a recipient, the data transfer to the recipient accessing at least a portion of the deposit; and processing the data transfer to the recipient during the temporal period using at least the portion of the deposit.

In some implementations, the deposit of the value instrument may be provided by a user that does not maintain a bank account accessible to the computer system.

In some implementations, the ATM may be configured to require the user to input one or more configuration parameters prior to depositing the value instrument.

In some implementations, the instructions may further cause the computer system to: provide, to a client device associated with the user, a data transfer interface and initiate a data transfer configuration session; and associate the data transfer configuration session with an ATM session during which the deposit of the value instrument was made based on a credential. The instruction to process the data transfer to the recipient may be received from the client device during the data transfer configuration session.

In some implementations, the credential may be provided to the client device during the data transfer configuration session and input to the ATM during the ATM session.

In some implementations, at least a portion of the credential may be output by the ATM during the ATM session and the credential may be input at the client device during the data transfer configuration session. In some implementations, the at least a portion of the credential is printed on a deposit slip by the ATM.

In some implementations, the instructions may further cause the computer system to: receive an indication of input of an identification document at the ATM; and initiate an ATM session for a non-customer at the ATM, the ATM session enabling the ATM to receive the deposit of the value instrument.

In some implementations, the ATM may include a first cassette for receiving deposits of value instruments and a second cassette for dispensing value instruments and the retention instruction may prevent withdrawal of the deposit at the ATM.

According to the subject matter of the present application, there may be provided a non-transitory computer-readable storage medium storing instructions that, when executed by a processor of a computer system, cause the computer system to perform the above-described method.

In a particular example, there may be provided non-transitory computer-readable storage medium storing instructions that, when executed by a processor of a computer system, cause the computer system to: receive, from an automated teller machine (ATM) an indication of a deposit of a value instrument; save a retention instruction including an associated temporal period, the retention instruction preventing withdrawal of value instruments corresponding to an amount of the deposit; receive, via the communications module, an instruction to process a data transfer to a recipient, the data transfer to the recipient accessing at least a portion of the deposit; and process the data transfer to the recipient during the temporal period using at least a portion of the deposit.

Accordingly to at least some examples described herein, value instruments (e.g., cash) received by the automated teller machine may be prevented from being withdrawn immediately but may be used, for example, for a data transfer. The systems described herein may, for example, be useful with ATMs that have different cassettes for dispensing and receiving value instruments. For example, the systems and methods described herein may prevent a user from depositing a value instrument in a first cassette and then attempting to withdraw a value instrument of equal or lesser value from a second cassette. This may, for example, allow non-customers to use ATMs for data transfers, such as bill payments, without enabling the swapping of counterfeit value instruments for valid value instruments.

At least some techniques described herein may be used, for example, with existing ATM infrastructure. For example, at least some embodiments described herein may allow a non-customer to use the ATM in order to process a data transfer without the need to update the hardware of existing ATMs. For example, a non-customer may rely on a client device associated with the non-customer (such as a smartphone, computer, etc.) to configure a data transfer through session association techniques described herein.

Further, at least some of the techniques described herein may solve technical problems related to deposits received at ATMs by non-customers. For example, orphaned deposits could occur if an ATM having separate cassettes for receiving deposits of value transfer instruments and for dispensing value transfer instruments are configured to accept value transfer instruments from non-customers. For example, if such an ATM were to accept a deposit from a non-customer in order to allow the non-customer to make a data transfer involving a deposited value transfer instrument, but the non-customer elected to not proceed with the data transfer, then the ATM could either: 1) attempt to return the value transfer instrument; or 2) prevent the return of the value transfer instrument. If the ATM attempted to return the value transfer instrument, then it may do so using the cassette for dispensing value instruments, which would be dispensing different value transfer instruments than those received at the ATM by the non-customer. This could create an opportunity for unscrupulous individuals to exchange counterfeit value instruments for valid value instruments, since the returned value transfers instruments would not be the same value instruments deposited (due to the separation of the cassettes and the single function associated with each cassette). If, instead, the ATM prevented the return of a value instrument to prevent such exchanges, the value transfer instrument could be orphaned. For example, since the individual that deposited the value transfer instrument may not have an account with a financial institution operating the ATM, returning the value transfer instrument to that individual (when the individual elects to not complete a data transfer) after the instrument has, for example, been subject to further scrutiny, may prove difficult or impossible. At least some techniques described herein may, therefore, address one or more such problems or other problems as will be understood based on the present description.

The value instruments described herein may include a banknote. Alternatively, or additionally, the value instruments may include a coin.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

As illustrated, an automated teller machine (ATM) 100 and a server system 110 communicate via a network 120.

A client device 140 may also communicate with the server system 110 via a network 120. In the example illustrated, the network 120 that connects the automated teller machine 100 to the server system 110 is the same network that connects the client device 140 to the server system 110. However, in other embodiments, these networks may be different networks. For example, the network connecting the automated teller machine 100 and the server system 110 may be largely comprised of a private network whereas the network connecting the client device 140 to the server system 110 may be largely comprised of a public network, such as the Internet.

The automated teller machine 100, the client device 140, and the server system 110 may be in geographically disparate locations. Put differently, the automated teller machine 100 and/or the client device 140 may be remote from the server system 110 and the client device 140 may be remote from the automated teller machine 100.

As further explained below, the automated teller machine 100, the client device 140 and the server system 110 are computer systems.

The automated teller machine 100 is adapted to provide access to banking services such as, for example, withdrawals and deposits. As further explained below, the automated teller machine 100 is configured to facilitate data transfers such as, for example, bill payments.

The server system 110 is a server that provides one or more back-office services to a financial institution including, for example, maintenance of accounts, payment processing, fraud detection and the like. The server system 110 may, for example, be or include a mainframe computer, a minicomputer, or the like. In some embodiments, the server system 110 may be formed of or may include one or more computing devices. For example, the server system 110 may include and/or may communicate with multiple computing devices such as, for example, database servers, compute servers, and the like. Multiple computing devices such as these may be in communication using a computer network. For example, such computing devices may communicate using a local-area network (LAN). In some embodiments, the server system 110 may include multiple computing devices organized in a tiered arrangement. For example, the server system 110 may include middle tier and back-end computing devices. In some embodiments, the server system 110 may be a cluster formed of a plurality of interoperating computing devices.

The client device 140 may be or include various types of computer systems including, for example, a smartphone, a personal computer, a tablet computer, a laptop computer, a wearable device such as a smart watch or glasses, an in-home appliance, a smart speaker, a vehicle, and/or a gaming console. The client device 140 may include or be connected to an input interface such as a keyboard, mouse, touchscreen interface, microphone, etc. The client device 140 may include or be connected to an output interface such as a display, speaker, etc. The input interface and output interface may provide a user interface that allows the client device to receive input at an input interface based on output provided at an output interface. The client device 140 may, for example, be configured to provide a data transfer user interface based on data received from the server system 110. The data transfer interface may, for example, allow the client device 140 to be used to configure a data transfer, based on a value instrument received at the ATM 100, to a recipient. For example, the client device 140 may be used to input configuration parameters for a bill payment in which value associated with a deposited value instrument may be transferred to a recipient.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, and/or the like. Additionally or alternatively, one or more devices may communicate with the computer network by way of a plain-old telephone service (POTS) line such as using a modem. In a particular example, the automated teller machine 100 may communicate with the server system 110, directly or indirectly, by way of a POTS line.

Example components of the automated teller machine 100 will now be described with reference to FIG. 2.

Figure 2:
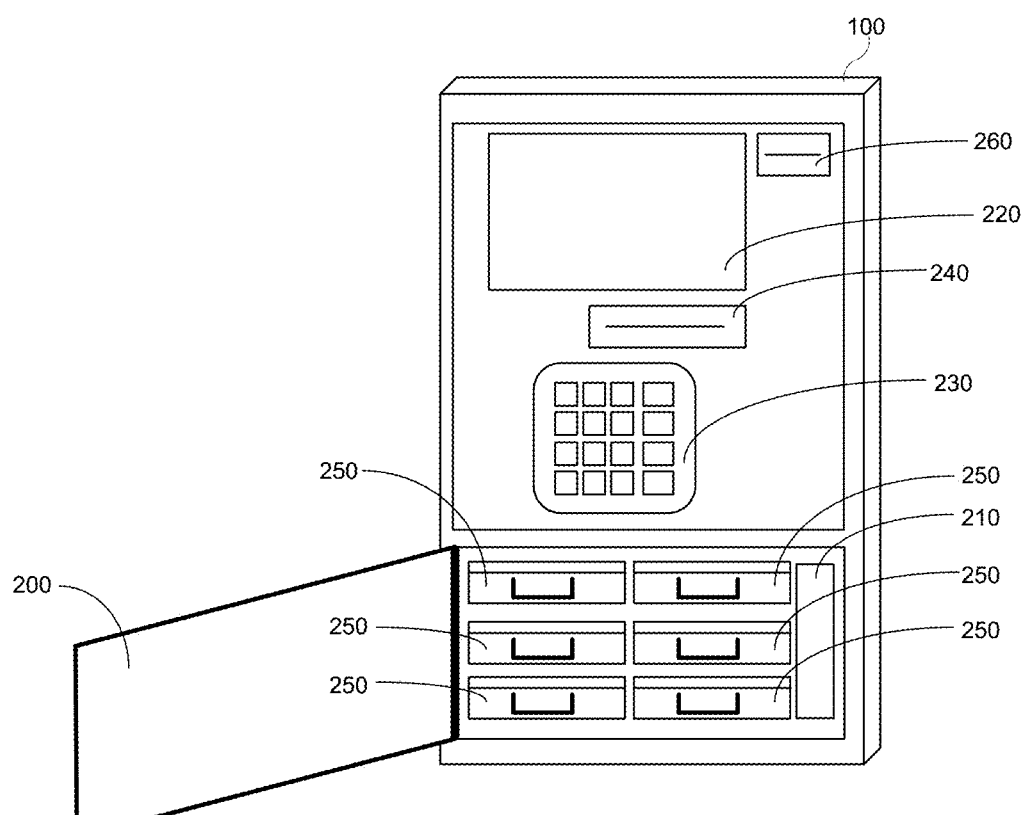
FIG. 2 is a simplified diagram showing components of an example automated teller machine.

FIG. 2 is a simplified diagram showing the automated teller machine 100 with an access panel 200 opened to reveal certain internal components.

As illustrated, the automated teller machine 100 may include a controller 210, a display 220, a keypad 230, an item receiver/dispenser 240, cassettes 250, and a card reader 260.

As further described below, the controller 210 is a computing device. For example, the controller 210 may include a processor that executes instructions retrieved from a computer-readable medium thereby causing the automated teller machine 100 to perform operations for providing access to banking services including handling deposits of value instruments which may then be recycled.

The display 220 may, for example, be a liquid-crystal display (LCD), a cathode-ray tube (CRT), or the like. The display 220 is for presenting information such as to a user of the automated teller machine 100. The display 220 may present information under control of the controller 210.

The keypad 230 is an input device allowing input to be provided to the automated teller machine 100. Input received via the keypad 230 may be conveyed to the controller 210. The keypad 230 may be used by a user to provide a personal identification number (PIN) to the automated teller machine 100 as a part of authenticating to the automated teller machine 100. In some embodiments, the keypad 230 may be used to input a credential which may be used to associate an ATM session with a data transfer configuration session on the client device 140.

The item receiver/dispenser 240 is a mechanical device allowing value instruments to be obtained by and dispensed by the automated teller machine 100. For example, it may be that the item receiver/dispenser 240 provides a single slot through which value instruments are received and dispensed. Additionally or alternatively, the item receiver/dispenser 240 may provide multiple slots such as, for example, one or more slots for receiving value instruments and one or more slots for dispensing value instruments. In some embodiments, the item receiver/dispenser 240 may consist of multiple mechanical units. Each such mechanical unit may be in communication with a respective slot of the automated teller machine 100. Additionally or alternatively, one or more of the mechanical units may communicate with the same slot—i.e., a shared slot. It may be that components or units of the item receiver/dispenser 240 are specialized to a particular type or types of value instrument. For example, a particular component or unit of the item receiver/dispenser 240 may be adapted to receiving and/or dispensing banknotes of one denomination, while another component or unit may be adapted to receiving and/or dispensing banknotes of another denomination. Alternatively, it may be that the item receiver/dispenser 240 is a monolithic unit that handles all manner of value instruments.

The item receiver/dispenser 240 is in communication with the cassettes 250. Each of the cassettes 250 may be adapted to receive or dispense value instruments. For example, a deposit cassette of the cassettes 250 may be adapted to receive value instruments that are provided for deposit. A deposit cassette may be or may include a bin. In another example, a cash cassette of the cassettes 250 may be loaded with bank notes that can be dispensed to satisfy withdrawals. In at least some embodiments, deposit cassettes and dispensing cassettes are single-direction cassettes. That is, any one cassette may either receive deposits or dispense withdrawals but not both.

The card reader 260 allows data to be read from a card such as, for example, a common ISO-sized ATM or cheque card. For example, the card reader 260 may allow data to be read from magnetic stripe cards and/or chip cards. In some embodiments, the card reader 260 may require a card to be swiped through it to be read (a so-called "swipe reader") and/or it may allow a card to be inserted into it for reading (a so-called "dip reader"). In some embodiments, the card reader 260 may be adapted to allow inserted cards to be retained by the automated teller machine 100 indefinitely (such as if fraud is suspected) and/or for the period of a session.

Figure 3:
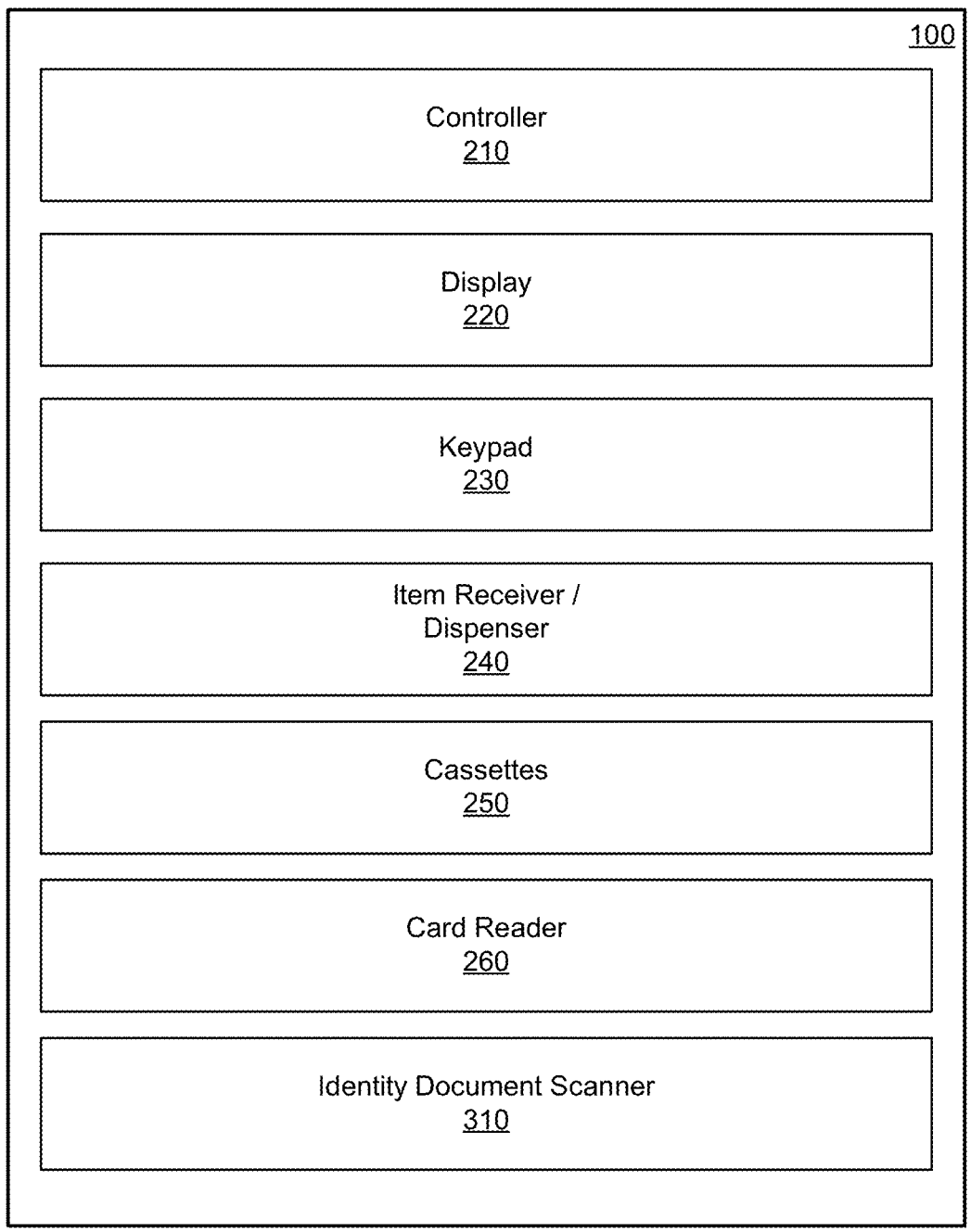
FIG. 3 is a logical block diagram of the example automated teller machine of FIG. 2.

In at least some embodiments, the ATM 100 may include an identity document scanner 310 (FIG. 3). The identity document scanner may be used, for example, to scan an identification document for a user (which may also be referred to herein as an identity document). The identification document is a document apart from an ATM or cheque card (i.e., it is not a bank card) which is used to uniquely identify the user. The identification document may be a government issued document. The identification document may be or include: a driver's license, a health card, a passport, a social insurance number, a birth certificate, a social security card, or an identification document of another type. The identity document scanner may take various forms including, for example, a camera or a scanner. In at least some embodiments, the identity document scanner may be provided by the card reader 260. For example, the card reader 260 may be configured to both read cards from customers, such as bank card, and identity cards for non-customers.

FIG. 3 is a logical block diagram of the automated teller machine 100. As described above, the automated teller machine 100 may include a controller 210, a display 220, a keypad 230, an item receiver/dispenser 240, cassettes 250, and a card reader 260 as described above. Additionally, as shown in FIG. 3, the automated teller machine 100 may include an identity document scanner 310 and a communications module 320.

As noted in the discussion of FIG. 2 above, the identity document scanner 310 is adapted to scan an identity document. The identity document scanner 310 may use one or more of a variety of scanning technologies. For example, the identity document scanner 310 may be or may employ a contact image sensor (CIS), a charge-coupled device (CCD), and/or the like.

Figure 4:
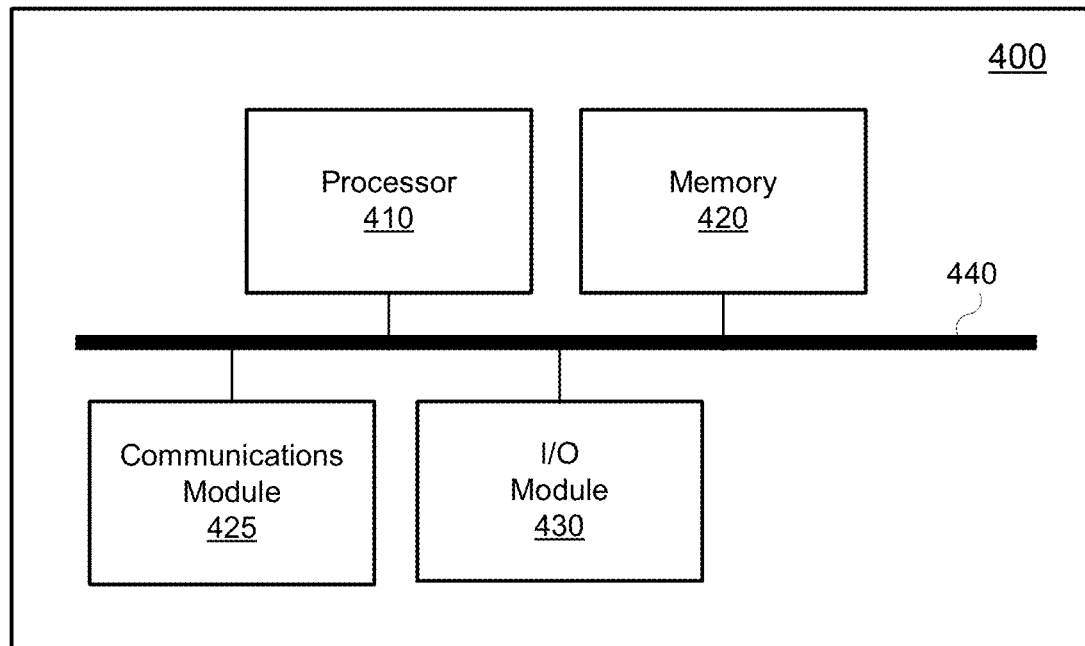
FIG. 4 is a high-level operation diagram of an example computing device.

FIG. 4 is a high-level operation diagram of an example computing device 400. In some embodiments, the example computing device 400 may be exemplary of one or more of the ATM 100 (FIG. 1), the controller 210 (FIG. 2), the client device 140 (FIG. 1) and the server system 110 (FIG. 1). As will be discussed in greater detail below, each of the automated teller machine 100 (FIG. 1) (and, potentially, the controller 210 in particular), the client device 140 and the server system 110 includes software that adapts it to perform a particular function.

The example computing device 400 includes a variety of modules. For example, as illustrated, the example computing device 400 may include a processor 410, a memory 420, a communications module 425 and an input/output (I/O) module 430. As illustrated, the foregoing example modules of the example computing device 400 are in communication over a bus 440.

The processor 410 is a hardware processor. The processor 410 may, for example, be one or more ARM, Intel x86, PowerPC processors or the like.

The memory 420 allows data to be stored and retrieved. The memory 420 may include, for example, random access memory, read-only memory, and persistent storage. Persistent storage may be, for example, flash memory, a solid-state drive or the like. Read-only memory and persistent storage are each a non-transitory computer-readable storage medium. A computer-readable medium may be organized using a file system such as may be administered by an operating system governing overall operation of the example computing device 400.

The I/O module 430 allows the example computing device 400 to interact with devices such as, for example, peripherals to send and receive data. The I/O module 430 may, for example, allow the example computing device 400 to interface with input devices such as, for example, keypads, keyboards, pointing devices, and the like. In another example, the I/O module 430 may, for example, allow the example computing device 400 to interface with output devices such as, for example, displays, printers, and the like. In a particular example, where the example computing device 400 forms a part of the automated teller machine 100 (FIG. 1) such as, for example, if the example computing device 400 is or forms a part of the controller 210 (FIG. 2) of the automated teller machine 100, the I/O module 430 may allow the example computing device 400 to interface with one or more of the display 220, the keypad 230, the item receiver/dispenser 240, the card reader 260, and/or the identity document scanner 310.

Software comprising instructions is executed by the processor 410 from a computer-readable medium. For example, software may be loaded into random-access memory from persistent storage of the memory 420. Additionally or alternatively, instructions may be executed by the processor 410 directly from read-only memory of the memory 420.

The communications module 425 allows the automated teller machine 100 to communicate with other computing devices and/or various communications networks such as, for example, the network 120. In other words, the communications module 425 may allow the automated teller machine 100, the client device 140 or the server system 110 as the case may be to send or receive communications signals. Communications signals may be sent or received according to one or more protocols or according to one or more standards. For example, the communications module 425 may allow the computing device 400 to communicate via an Ethernet network, an ATM network, a telephone network, and/or via cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 425 may allow the computing device 400 to communicate using near-field communication (NFC), via Wi-Fi™, using Bluetooth™ or via some combination of one or more networks or protocols.

Figure 5:
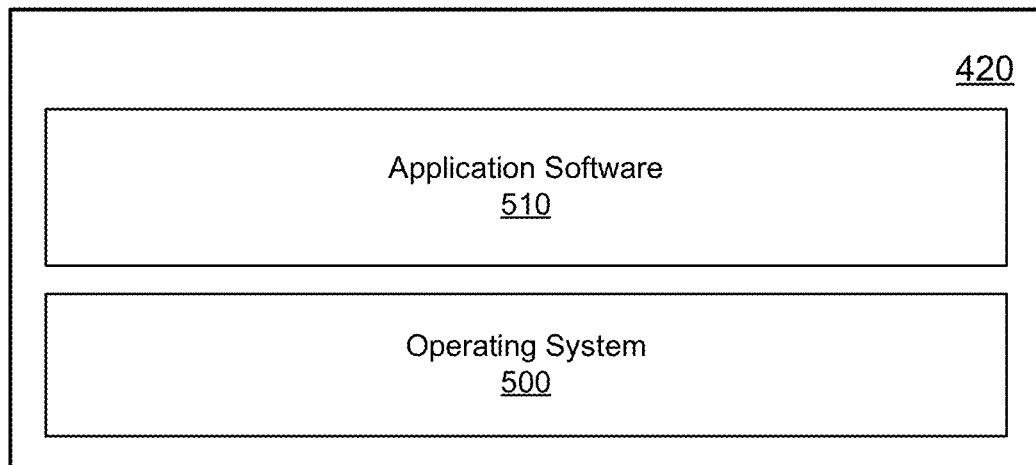
FIG. 5 depicts an example simplified software organization of the example computing device of FIG. 4.

FIG. 5 depicts a simplified organization of software components stored in the memory 420 of the example computing device 400. As illustrated these software components include an operating system 500 and application software 510.

The operating system 500 is software. The operating system 500 allows the application software 510 to access the processor 410, the memory 420, and the I/O module 430. The operating system 500 may be, for example, UNIX™, Linux™, Microsoft™ Windows™, Apple OSX™ or the like.

The application software 510 adapts the example computing device 400, in combination with the operating system 500, to operate as a device performing a particular function. For example, the application software 510 may cooperate with the operating system 500 to adapt a suitable embodiment of the example computing device 400 to operate as the controller 210 (FIG. 2) of the automated teller machine 100 (FIGS. 1, 2 and 3) or as the client device 140 (FIG. 1) or as the server system 110 (FIG. 1).

Operations performed by the automated teller machine 100, the client device 140 and/or the server system 110 will be described below with reference to FIG. 6.

Figure 6:
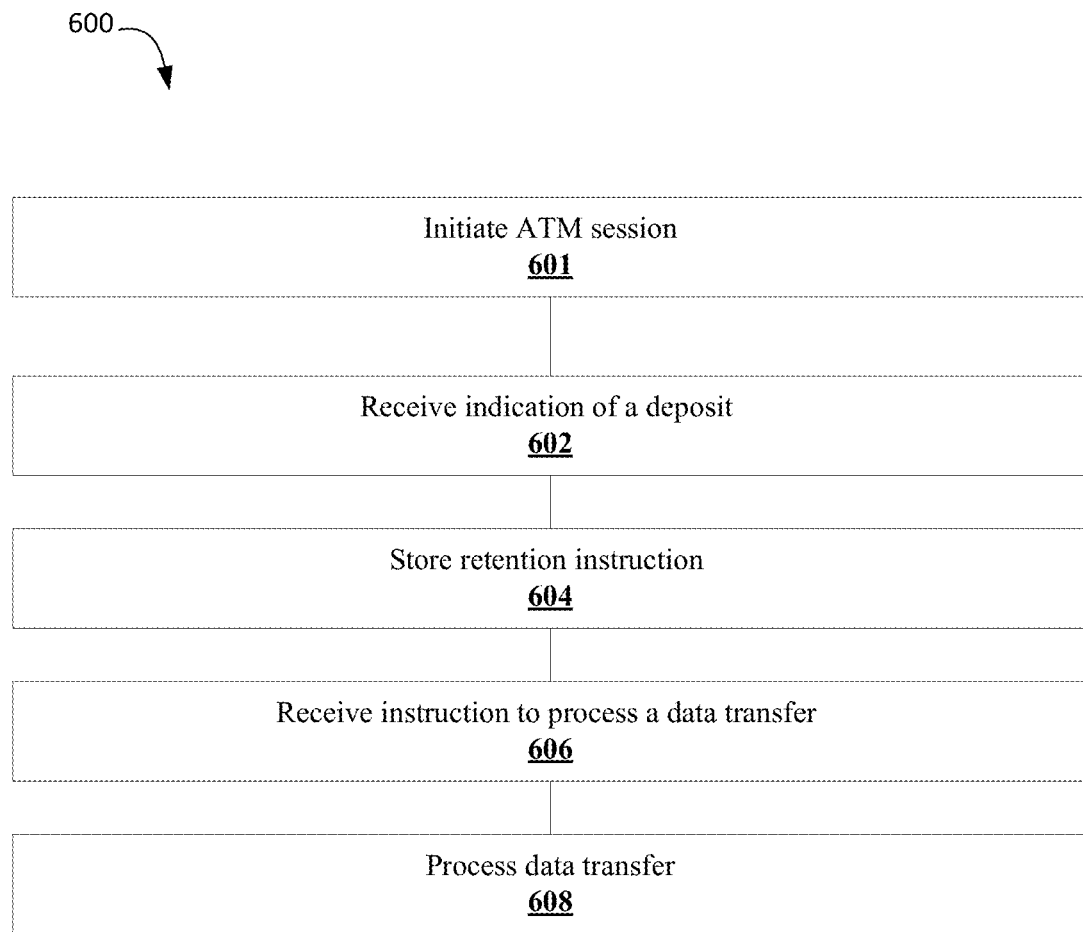
FIG. 6 provides a flowchart depicting example operations performed for processing a data transfer.

FIG. 6 provides a flowchart of a method 600 depicting example operations performed in processing a data transfer. Operations 601 and onward are performed by one or more processors of one or more computing devices, such as, for example, the processor 410 (FIG. 4) of one or more suitably configured instances of the example computing device 400 (FIG. 4), executing software such as, for example, a suitable instance of the application software 510 (FIG. 5). In a particular example, one or more of the operations 601 and onward may be performed by a processor of a computer system such as the server system 110.

The method 600 may include, an operation 601 of initiating an ATM session. ATM sessions may be initiated in various ways and the manner of initiation may, in at least some embodiments, depend on the nature of the user. For example, users having a bank account managed or maintained by the server system 110 (such users may generally be referred to herein as "customers") may initiate an ATM session in a different way than users that do not have such an account (such users may generally be referred to herein as "non-customers"). A user having an account that is managed or maintained by the server system 110 may initiate an ATM session through insertion of a card in a card reader 260 of the ATM and through input of an associated credential at the ATM, such as input of a PIN via a keypad 230 of the ATM. The server system 110 may receive a representation of the credential from the ATM via a communications module and may also receive an indication of data received at the ATM from the card and may authenticate the user by determining that the credential is valid for the card. Other authentication techniques are also possible.

When an ATM session is initiated for a customer, the server system 110 may identify an existing account associated with the customer. The server system may, for example, provide data to the ATM that is based on account data for the customer. By way of example, a balance may be provided to the ATM.

For a non-customer (i.e., for a user not having a bank account managed or maintained by the server system 110), the ATM session may be initiated without requiring input of the card and/or authentication. By way of example, in some embodiments, an identity document scanner 310 may be provided by the ATM 100 and initiating an ATM session may involve a user scanning an identity document using the document scanner 310. Types of identity documents are described above and identity documents may, for example, include government issued identity documents. The ATM 100 may then send an indication of input of the identification document at the ATM to the server system. The indication may, for example, include a photograph or scan of the identity document and/or data extracted from the identity document. In response to receiving the indication of the input of the identification document at the ATM, the server system may initiate an ATM session for the non-customer at the ATM.

In at least some embodiments, for a non-customer, the server system 110 may automatically create a temporary account for the non-customer. The temporary account may be created based on data obtained from the identity document, for example. By way of example, a name, address, and/or other identifying information may be identified from the identity document by the server system using, for example, optical character recognition (OCR). In some embodiments, the information obtained from the identity document may be supplemented with other information about the user by using the obtained information to request other associated information from another server having such other associated information. By way of example, a driver's license number may be extracted and used in an application programming interface (API) call to another server which may then provide other data that is associated with that driver's license number. The temporary account may include a temporary account balance which may be initialized with zero.

The ATM session may be initiated in other manners in other embodiments. For example, the server system and the ATM may allow deposits to be made anonymously or semi-anonymously. Accordingly, in at least some embodiments, an ATM session may be initiated for a non-customer without requiring the non-customer to scan an identification document. For an anonymous or semi-anonymous user, a temporary account may be created and may be associated with a unique identifier. The unique identifier may, for example, be a credential such as a unique number that may be generated by the server system using, for example, a random or pseudo-random number generator.

The ATM session, once initiated, allows the ATM to receive a deposit of a value instrument. That is, the deposit of a value instrument may be made by a user (which may be a customer or a non-customer as the case may be) at the ATM 100 (FIG. 1). The deposit may be made through insertion of the value instrument(s) in an item receiver 240 of the ATM 100. The ATM 100 may include a first cassette for receiving deposits of value instruments and the first cassette may be coupled to the item receiver 240 such that the value instrument is received in the first cassette.

The ATM may, after receiving the deposit, provide an indication of the deposit of the value instrument to the server system 110. Accordingly, at operation 602, the server system 110 may receive, from the automated teller machine (ATM) and via a communications module, an indication of a deposit of a value instrument.

The indication may, for example, include an image of the value instrument(s) and/or an indication of a deposit amount. The indication of the deposit amount may be automatically determined (e.g., by performing image-based or other scanning operations on the value instruments) by the ATM and/or may be based on user input. For example, a user may be required, as part of the deposit process, to input, through an input interface of the ATM such as the keypad 230, an amount of the deposit and the ATM may include the inputted amount in the indication.

After receiving the indication of the deposit, at operation 604, the server system 110 saves, in memory, a retention instruction. The retention instruction includes an associated temporal period and the retention instruction prevents withdrawal of value instruments corresponding to an amount of the deposit during the temporal period. The temporal period may, for example, be a hold period. The hold period may, in at least some embodiments, be a predetermined number of days, which may, for example, represent business days. The number of days may, for example, be sufficiently long to allow the value instruments to be subjected to further scrutiny. The number of days may be five business days, for example.

The retention instruction may, for example, be used to prevent the swapping of invalid currency for valid currency. For example, as noted above, the ATM 100 may include a first cassette for receiving deposits of value instruments and a second cassette for dispensing value instruments. The retention instruction may, for example, prevent withdrawal of the deposit at the ATM which may, for example, prevent a user from submitting value instruments into the first cassette and then withdrawing other value instruments from the second cassette.

The retention instruction may be saved in association with the account for the user, which may be an existing account (e.g., an account for a customer) or a temporary account (e.g., an account generated on-the-fly for a non-customer).

In some embodiments, the server system 110 may credit an account associated with the user in an amount that is equal to the deposited amount. For example, an account balance associated with the user may be increased by an amount that is equal to the amount of the deposit of the value instruments. The account may be the existing account in the case of a customer or a temporary account in the case of a non-customer.

While the account may be credited based on the deposit, the retention instruction may act to prevent withdrawal of the deposited amount during the temporal period. The retention instruction may prevent a cash withdrawal of the value instrument at any ATM and not only at the ATM where the deposit was made.

At operation 606, the server system 110 receives an instruction to process a data transfer to a recipient. The instruction to process the data transfer to the recipient may be received at the server system 110 through the communications module. The instruction to process the data transfer to the recipient may, in at least some embodiments, be received from the ATM. For example, the ATM may provide a user interface that allows for input of one or more configuration parameters for the data transfer. The configuration parameters may include, for example, an identifier of a recipient (e.g., a name or other identifier), an account number or other identifier for the user with the recipient (e.g., an identifier that is used to allow the recipient to determine the source of the data transfer), an amount of the data transfer and/or other configuration parameters.

The configuration parameters may be configured through an input interface of the ATM, for example. By way of example, the ATM may cooperate with the server system to allow for selection by the user of any one of a plurality of pre-configured recipients. That is, the server system may maintain a list of supported recipients and the ATM may retrieve and display the list or a portion thereof. For example, a user may input one or more characters describing the intended recipient and the server system and/or the ATM may perform a search of the list of supported recipients based on such input and may display matches for selection by the user.

In at least some embodiments, the amount of the data transfer may not need to be defined—the amount may be automatically configured by the server system to the amount of the deposit. That is, if the user has deposited twenty dollars, then the amount of the data transfer may be twenty dollars.

The data transfer may, in at least some embodiments and for at least some users, represent a bill payment. The data transfer to the recipient may access at least a portion of the deposit. That is, the data transfer to the recipient may transfer value that relies upon the value instrument represented by the indication received at operation 602.

In at least some embodiments, non-customers may be required to input contact information that may be used in case of a data transfer error. The contact information may, for example, include an email address or a messaging address of another type, a telephone number, etc. If, for example, the server system is unable to complete the data transfer for any reason, the contact information may be used to facilitate return of the value instruments.

At operation 608, the server system processes the data transfer to the recipient. The data transfer uses at least a portion of the deposit. In at least some embodiments, the data transfer uses all of the deposit. The data transfer may be processed so that the data transfer to the recipient occurs during the temporal period. That is, the hold does not restrict the data transfer in the same way that it restricts withdrawals. Data transfers to supported recipients are permitted during the hold period but withdrawals are not.

In at least some embodiments, the data transfer may be configured to be performed immediately. That is, the data transfer may be configured so that it is performed without delay so that a recipient's account will be credited with value based on the deposit without delay. In doing so, value represented in the existing or temporary account may be transferred to an account associated with the recipient. For example, the existing or temporary account may be debited by the amount of the data transfer and the recipient account may be credited by the same amount (less any transaction fees). Non-customers may be required to transfer the full amount of the deposit so that the balance of the temporary account becomes zero.

After a transfer from a temporary account is completed, the temporary account may be deleted and/or disabled. In at least some embodiments, determined information, such as contact information, may be retained for at least a determined period of time following completion for use, for example, in the case of any disputes.

The supported data transfer recipients may be required to maintain identification data for their customers. In at least some embodiments, a server associated with the recipient may, in response to detecting the data transfer, identify an account to which the data transfer is to be applied. This server may then be required to provide identification data retrieved from the identified account to the server system. The server system may then store such data in association with the temporary account for use in case the value instruments deposited are subsequently found to be invalid.

In some instances, it may be that a data transfer is not completed after value instruments have been deposited. That is, operations 602 and 604 may be performed, but operation 608 may not be performed or completed. This may occur due to any one of a number of factors. For example, a user may not input configuration parameters in order to configure the data transfer (e.g., operation 606 may not be performed). In another example, the data transfer may fail because one of the configuration parameters was improperly input. In such a scenario, the user may wish to withdraw the deposit. The user may not do so immediately, since the retention instruction prevents such withdrawal. That is, the server system acts to prevent the withdrawal during the hold period. Instead, the user must wait until expiration of the temporal period associated with the retention instruction.

In some instances, when a data transfer is not completed, the server system may configure the ATM to print a deposit slip which includes any one or a combination of: an address portion of a credential; a value represented by the deposit; and an indication of the temporal period. For example, the deposit slip may indicate the amount deposited (e.g., S20), the address portion of the credential (e.g., user143) and the hold period (e.g., "You can claim your deposit at an ATM in 5 days" or "You can claim your deposit at an ATM after Jan.

23, 2020"). A non-customer wishing to withdraw the deposit may use their credential (e.g., the address portion of the credential and the secret portion of the credential) to authenticate themselves to an ATM (which may be the ATM on which they made the deposit or another ATM associated with the server system). The credential associates the user with the temporary account and they may then withdraw the deposit after expiration of the temporal period.

A customer may withdraw the deposit after expiration of the temporal period using their card (e.g., bank card) and associated credential (e.g., PIN).

The method and process 600 described above with reference to FIG. 6 is capable of variation. For example, in at least some embodiments, at example of which will now be described with reference to FIG. 1, the server system may be configured to further prevent or attempt to prevent orphaned deposits. In order to do so, in at least some embodiments, the ATM may be configured to require a user to input configuration parameters for a data transfer prior to depositing the value instrument. That is, the ATM and/or the server system may be configured to only accept a deposit from a non-customer if the non-customer has first configured parameters for a data transfer.

Operations performed by the automated teller machine 100, the client device 140 and/or the server system 110 will be described below with reference to FIG. 7.

Figure 7:
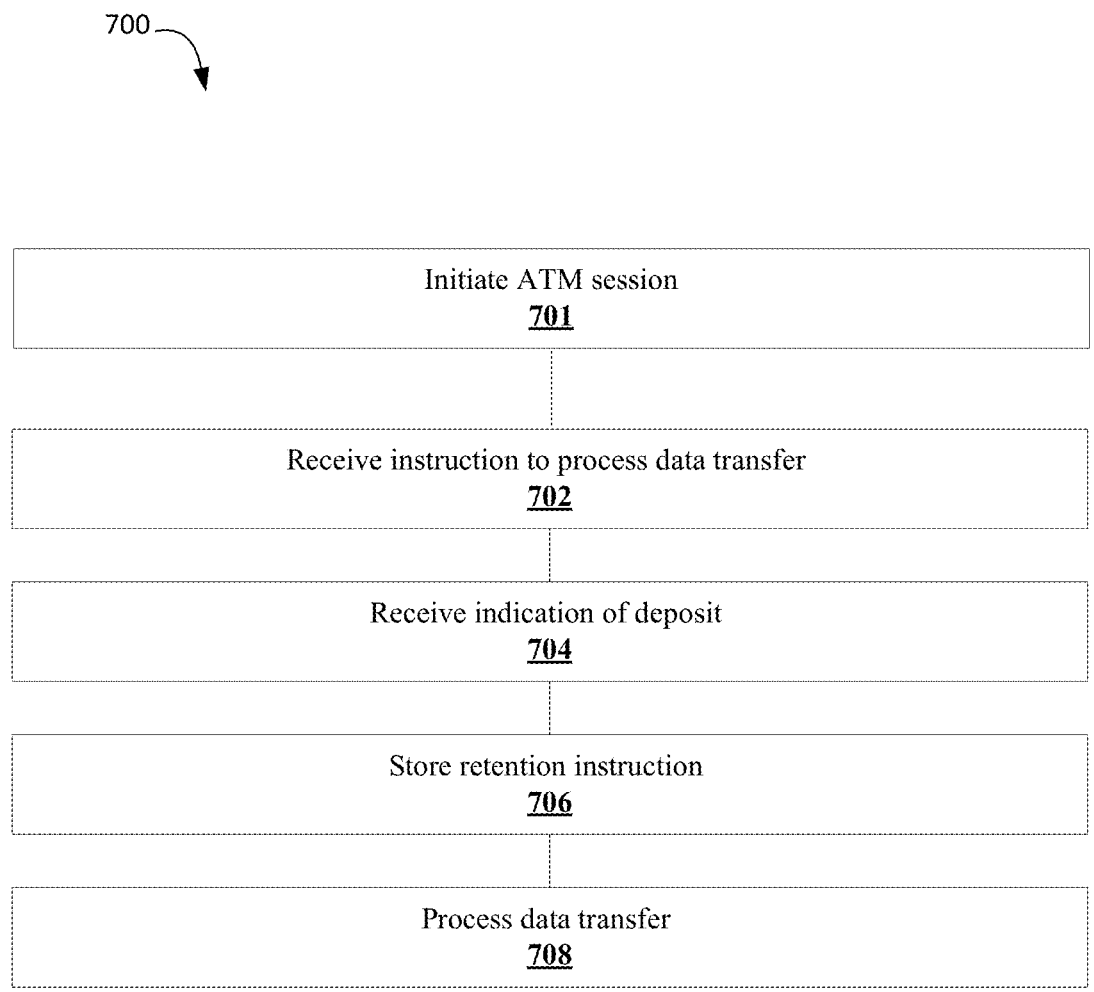
FIG. 7 provides a flowchart depicting example operations performed for processing a data transfer.

FIG. 7 provides a flowchart of a method 700 depicting example operations performed in processing a data transfer. Operations 701 and onward are performed by one or more processors of one or more computing devices, such as, for example, the processor 410 (FIG. 4) of one or more suitably configured instances of the example computing device 400 (FIG. 4), executing software such as, for example, a suitable instance of the application software 510 (FIG. 5). In a particular example, one or more of the operations 701 and onward may be performed by a processor of a computer system such as the server system 110. In at least some embodiments, the operations of the method 700 may be performed by the server system 110 in cooperation with the ATM 100.

At operation 701, the method 700 includes, initiating an ATM session. Operation 701 may be performed in the manner described above with reference to operation 601 of the method 600 of FIG. 6.

Once the ATM session is initiated for a non-customer, the ATM may require a user to configure a data transfer prior to receiving a deposit. For example, an item receiver 240 may be disabled until the non-customer configures the data transfer.

Accordingly, at operation 702, the method may include receiving an instruction to process a data transfer. Operation 702 may be performed in the manner described above with reference to the operation 606 of the method 600 of FIG. 6. For example, configuration parameters may be received from the ATM 100 in the manner described with reference to operation 606.

After the instruction to process the data transfer is received, the server system and/or the ATM may then enable the item receiver 240 at the ATM. Then, at operation 704, the server system may receive an indication of a deposit and may optionally, at operation 706 store a retention instruction. Operations 704 and 706 may be the same or similar to operations 602 and 604 of the method 600 of FIG. 6 respectively.

At operation 708, the server system 110 may process the data transfer in the manner described above with reference to operation 608 of the method 600 of FIG. 6.

It may be noted that, according to the method 700 of FIG. 7, since the ATM will not accept the deposit unless the data transfer has been previously configured, operation 706 may have less importance than with the method 600 of FIG. 6. It may, however, be useful in circumstances in which the data transfer at operation 708 fails. This may occur, for example, if data transfer configuration parameters are input incorrectly. In such circumstances, the retention instruction may prevent withdrawal until after expiration of the temporal period defined by the retention instruction. As noted in the discussion of FIG. 6 above, for the case of a non-customer, the credentials may be used to facilitate such withdrawal. Customers can withdraw the value transfer instruments using their associated card (e.g., bank card) and a credential (e.g., PIN) after expiration of the temporal period.

Figure 8:
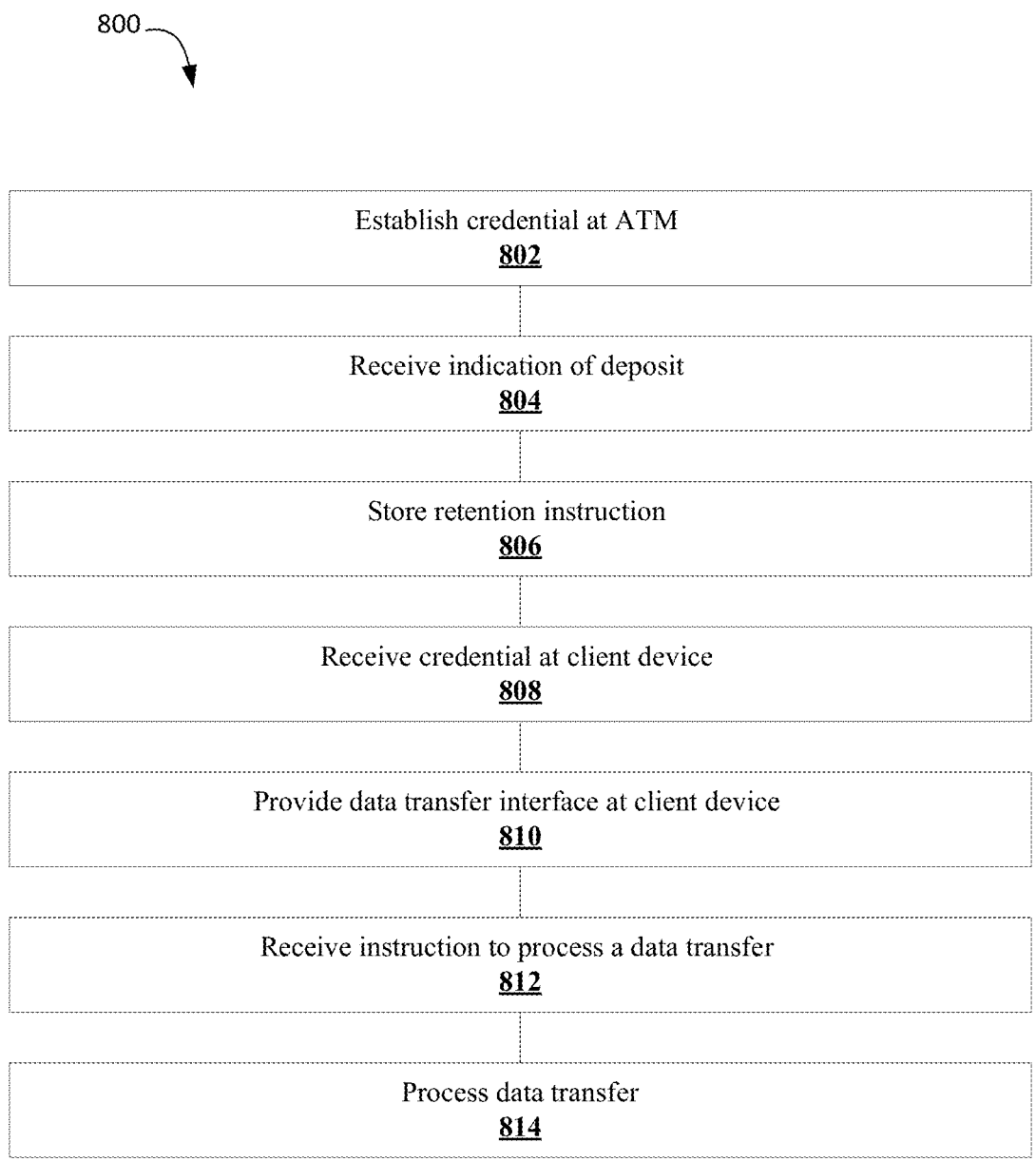
FIG. 8 provides a flowchart depicting example operations performed for processing a data transfer.

Reference will now be made to FIG. 8 which illustrates a flowchart of a further example method 800 depicting example operations performed in processing a data transfer. The method 800 of FIG. 8 is a further variation of the methods 600, 700 described above. According to the method of FIG. 8, data transfer configuration functions are separated from depositing functions. For example, an ATM may be used for depositing functions but not for data transfer configuration. Instead, data transfer configuration may be performed on a client device, such as a smartphone associated with a user. Notably, separating data transfer configuration from deposit receipt may, for example, allow the method to be performed with existing ATM infrastructure which may not include data transfer configuration functionality.

Operations 802 and onward are performed by one or more processors of one or more computing devices, such as, for example, the processor 410 (FIG. 4) of one or more suitably configured instances of the example computing device 400 (FIG. 4), executing software such as, for example, a suitable instance of the application software 510 (FIG. 5). In a particular example, one or more of the operations 802 and onward may be performed by a processor of a computer system such as the server system 110. In at least some embodiments, the operations of the method 800 may be performed by the server system 110 in cooperation with the ATM 100.

At operation 802, the method includes establishing a credential at ATM. The credential may be established in various ways. For example, in at least some embodiments, the credential may be generated by the server system and sent to the ATM for output through an output interface associated with the ATM. The credential may, in at least some embodiments, include randomly or pseudo-randomly data that may be generated by a random number generator or pseudo-random number generator at the ATM.

In some embodiments, the credential may include identification data for the user. For example, an identification document may be scanned using the identity document scanner 310 and the identification data may be extracted or otherwise determined based on the identification document. For example, a name of the user may be used as a portion of a credential.

In some embodiments, the server system may deterministically obtain the credential or a portion thereof based on determined data, such as data that may be obtained from the identification document. By way of example, a hash may be performed based on certain identification data, such as a user's name.

In at least some embodiments, the server system may establish the credential or a portion of the credential based on user input received at the ATM. For example, a user may input a PIN, passcode or other input through an input interface of the ATM, such as the keypad 230, and the inputted data may be included in the credential.

The credential includes at least some uniquely identifying data that is not used for other accounts (whether temporary or existing). More particularly, an address portion of the credential may be required to be unique. The address portion of the credential may be a username, identifier, etc.

The server system may, in order to ensure uniqueness, evaluate a portion of a credential (such as a username, identifier, etc.) against a namespace for the server system. When that portion of the credential is determined to not be unique, the server system may automatically determine a new proposed credential portion until settling on a unique portion.

In at least some embodiments, the credential may be a multi-part credential. For example, the credential may include an address portion, which is the unique portion of the credential, and a secret portion. The server system may, for example, automatically generate the address portion but allow a user to self-define the secret portion. The secret portion may be, for example, a passcode or PIN.

The server system may, in establishing the credential, output the credential or a portion of the credential on an output interface of the ATM. For example, an address portion of the credential may be displayed on the display 220 of the ATM and/or may be output to a printer of the ATM (e.g., included on a deposit slip which may be generated after operation 804, which will be discussed below).

The server system may also create a temporary account for the user and associate the credential with the temporary account. As noted in the discussion of FIG. 6 above, temporary accounts may be initialized with a balance of zero which may then be adjusted to account for deposits made in subsequent operations of the method 800.

At operation 804, the server system receives an indication of a deposit at the ATM and, at operation 806, stores a retention instruction. Operations 804 and 806 may be performed as described above with respect to the operations 602 and 604 respectively of the method 600.

In at least some embodiments, after operation 804, the ATM may print a deposit slip. The deposit slip may, for example, include a representation of the total value of the value instruments deposited at operation 804. The deposit slip may also include the credential or a portion thereof. For example, an address portion of the credential may be included. In at least some embodiments, a secret portion of the credential (such as a user-defined PIN) may not be included.

In some embodiments, the deposit slip may include a machine-readable code, such as a barcode. For example, a deposit slip may (after operation 804) be printed to include a quick response (QR) code. The QR code may include, represent and/or be based on the credential or a portion thereof. For example, the address portion of the credential may be included in the QR code and, in at least some embodiments, the QR code may include, represent and/or be based on a link to a webpage or application that may provide a data transfer interface that may be used to initiate a data transfer. For example, in at least some embodiments, the QR code may be scanned by a client device (e.g., using a camera) and the QR code may cause the client device to navigate to the webpage or to download or open the application. In at least some embodiments, the credential may be obtained by the client device from the QR code and may be used so that the user does not have to manually input the credential into the client device. For example, the link included or represented by the QR code may pass, to the server system, the credential. The server system may then, for example, provide a user interface such as a webpage that requests input of the secret portion of the credential.

The QR code may, in at least some embodiments, be displayed on a display of the ATM instead of or in addition to being printed on the deposit slip.

In other embodiments, the address portion of the credential may be manually input to a client device. For example, the deposit slip may list a webpage address that a user is to navigate to (e.g., www.anonymouspay.com). The webpage address may point to a webpage that is served by the server system. The webpage may request input of the credential, including the address portion. The server system may then receive the credential and authenticate the credential (e.g., determine that the address portion of the credential is valid and/or that the secret portion is correct for the address portion).

Accordingly, the credential is received at the client device at an operation 808 and is sent to the server system where it is received. The server system may then associate a data transfer configuration session with the ATM session during which the deposit of the value instrument was made. The server system makes such an association based on the credential.

Next, at an operation 810, the server system may provide, to the client device (which is effectively determined to be a client device associated with the user having made the deposit due to the matching credentials), a data transfer interface and may initiate the data transfer configuration session. The data transfer interface may prompt the user to input the configuration parameters for the data transfer, such as the recipient, amount, etc. Configuration parameters are discussed in greater detail above with reference to FIG. 6.

In at least some embodiments, the data transfer interface may automatically configure a data transfer amount to be equal to the total value of the value instruments deposited.

Next, at an operation 812, an instruction to process a data transfer is received through the data transfer interface. The instruction received at operation 812 may be the same or similar to that received at operation 606 of the method 600 of FIG. 6, except that it is received from the client device, through the data transfer interface, during the data transfer configuration session.

Next, at an operation 814, the server system processes the data transfer. Operation 814 may be the same or similar to operation 608 of the method 600 of FIG. 6.

FIG. 8 generally illustrates the operations involving the ATM as occurring prior to the operations involving the client device. That is, at least a portion of the credential is displayed or otherwise output by the ATM during the ATM session and input at the client device during the data transfer configuration session. However, in other embodiments, the data transfer configuration session may occur prior to the ATM session. That is, the credential may be established during the data transfer configuration session (e.g., it may be determined by the server system and provided to the client device during the data transfer configuration session) and input to the ATM during the ATM session. It may be noted that such an order of operations may prevent or ameliorate the orphaned deposit problem described herein. For example, the ATM could be configured to only accept deposits from non-customers if they have previously configured a data transfer on a client device.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer system comprising:
   a communications module;
   a processor coupled to the communications module; and
   a memory coupled to the processor storing instructions that, when executed by the computer system, cause the computer system to:
   receive, without authentication with a user and from an automated teller machine (ATM) and via the communications module, an indication of a deposit by the user of a value instrument;
   save, in the memory, a retention instruction including an associated temporal period, the retention instruction preventing withdrawal of value instruments corresponding to an amount of the deposit;
   receive, via the communications module, an instruction to process a payment to a recipient, the payment to the recipient accessing at least a portion of the deposit; and
   process the payment to the recipient during the temporal period using at least the portion of the deposit.

2. The computer system of claim 1, wherein the deposit of the value instrument is provided by a user that does not maintain a bank account accessible to the computer system.

3. The computer system of claim 2, wherein the ATM is configured to require the user to input one or more configuration parameters prior to depositing the value instrument.

4. The computer system of claim 1, wherein the instructions further cause the computer system to:
   provide, to a client device associated with a user, a payment interface and initiate a payment configuration session; and
   associate the payment configuration session with an ATM session during which the deposit of the value instrument was made based on a credential,
   wherein the instruction to process the payment to the recipient is received from the client device during the payment configuration session.

5. The computer system of claim 4, wherein the credential is provided to the client device during the payment configuration session and input to the ATM during the ATM session.

6. The computer system of claim 4, wherein at least a portion of the credential is output by the ATM during the ATM session and wherein the credential is input at the client device during the payment configuration session.

7. The computer system of claim 6, wherein the at least a portion of the credential is printed on a deposit slip by the ATM.

8. The computer system of claim 1, wherein the instructions further cause the computer system to:
   receive an indication of input of an identification document at the ATM; and
   initiate an ATM session for a non-customer at the ATM, the ATM session enabling the ATM to receive the deposit of the value instrument.

9. The computer system of claim 1, wherein the ATM includes a first cassette for receiving deposits of value instruments and a second cassette for dispensing value instruments and wherein the retention instruction prevents withdrawal of the deposit at the ATM.

10. The computer system of claim 1, wherein the temporal period is a hold period.

11. A computer-implemented method comprising:
    receiving, without authentication with a user and from an automated teller machine (ATM), an indication of a deposit by the user of a value instrument;
    saving a retention instruction including an associated temporal period, the retention instruction preventing withdrawal of value instruments corresponding to an amount of the deposit;
    receiving an instruction to process a payment to a recipient, the payment to the recipient accessing at least a portion of the deposit; and
    processing the payment to the recipient during the temporal period using at least the portion of the deposit.

12. The method of claim 11, wherein the deposit of the value instrument is provided by a user that does not maintain a bank account accessible to a computer system implementing the method.

13. The method of claim 12, wherein the ATM is configured to require the user to input one or more configuration parameters prior to depositing the value instrument.

14. The method of claim 11, further comprising:
    providing, to a client device associated with a user, a payment interface and initiating a payment configuration session; and
    associating the payment configuration session with an ATM session during which the deposit of the value instrument was made based on a credential,
    wherein the instruction to process the payment to the recipient is received from the client device during the payment configuration session.

15. The method of claim 14, wherein the credential is provided to the client device during the payment configuration session and input to the ATM during the ATM session.

16. The method of claim 14, wherein at least a portion of the credential is output by the ATM during the ATM session and wherein the credential is input at the client device during the payment configuration session.

17. The method of claim 16, wherein the at least a portion of the credential is printed on a deposit slip by the ATM.

18. The method of claim 11, further comprising:
    receiving an indication of input of an identification document at the ATM; and
    initiating an ATM session for a non-customer at the ATM, the ATM session enabling the ATM to receive the deposit of the value instrument.

19. The method of claim 11, wherein the ATM includes a first cassette for receiving deposits of value instruments and a second cassette for dispensing value instruments and wherein the retention instruction prevents withdrawal of the deposit at the ATM.

20. A non-transitory computer-readable storage medium storing instructions that when executed by a processor of a computer system cause the computer system to:

receive, without authentication with a user and from an automated teller machine (ATM), an indication of a deposit by the user of a value instrument;
save a retention instruction including an associated temporal period, the retention instruction preventing withdrawal of value instruments corresponding to an amount of the deposit;
receive an instruction to process a payment to a recipient, the payment to the recipient accessing at least a portion of the deposit; and
process the payment to the recipient during the temporal period using at least the portion of the deposit.

* * * * *